Feb. 26, 1929.
C. J. ALLEN
1,703,467
SEED DRILL
Filed April 27, 1928   2 Sheets-Sheet 1
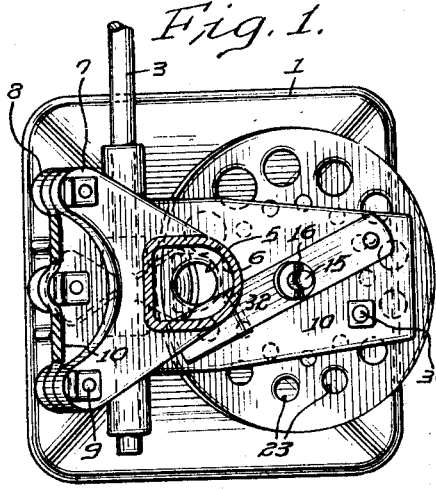
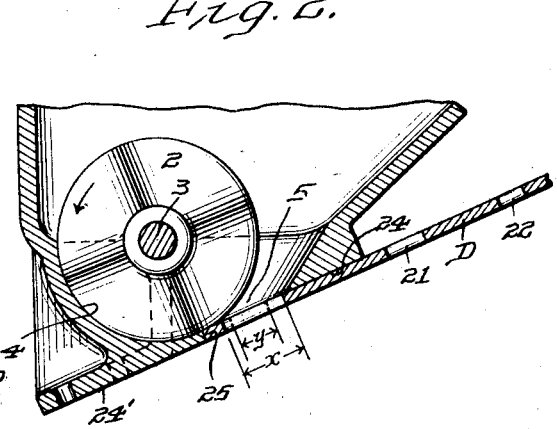
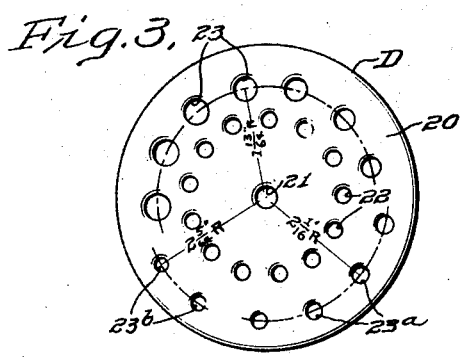
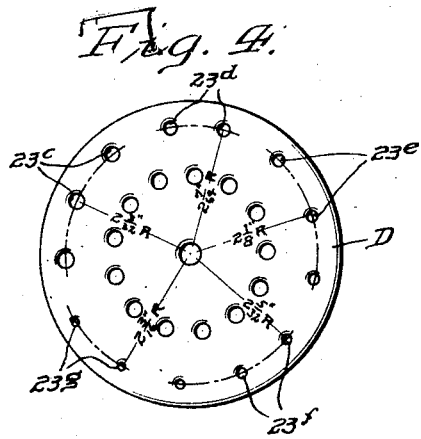
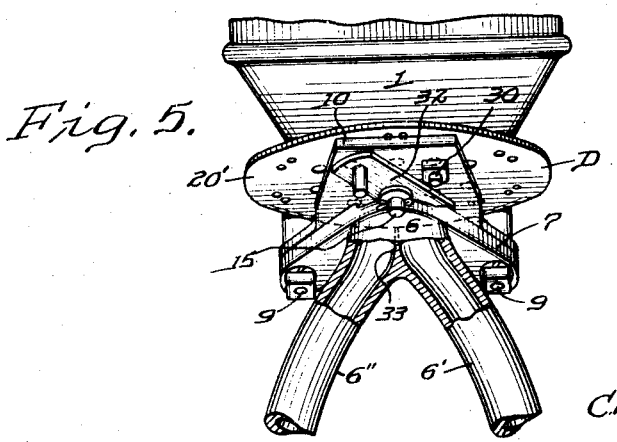
INVENTOR
Charles J. Allen
BY
ATTORNEYS
WITNESS Feb. 26, 1929. 1,703,467
C. J. ALLEN
SEED DRILL
Filed April 27, 1928 2 Sheets-Sheet 2
Fig. 6.
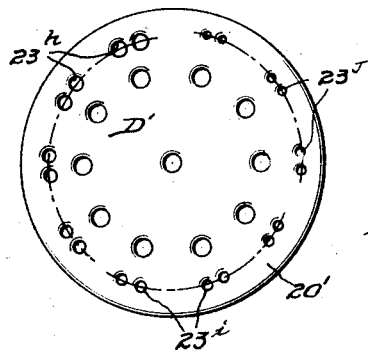
Fig. 7.
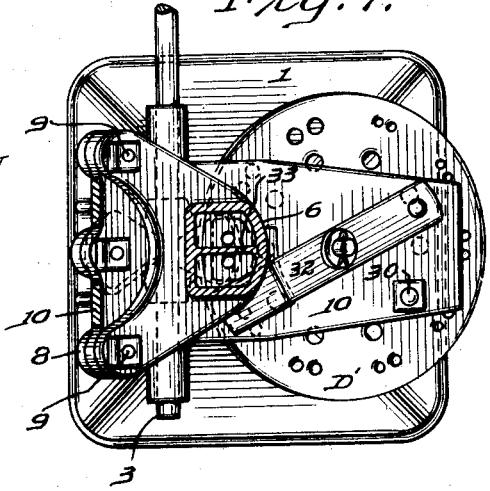
Fig. 8.
Fig. 9.
WITNESS
F. J. Hartman.
INVENTOR
Charles J. Allen
BY
ATTORNEYS Patented Feb. 26, 1929.

1,703,467

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

SEED DRILL.

Application filed April 27, 1928. Serial No. 273,196.

My invention relates to seed drills intended for sowing seeds of various kinds and sizes and more particularly to the means for adjusting the drill to the particular kind of seed which is to be sown.

Many agriculturists own but a single drill and utilize the same in sowing many different sorts of seed in their farming operations, the sizes thereof ranging from very small seeds, such as celery seeds, to relatively large seeds, such as peas or beans, and in order to insure the most satisfactory crop it is necessary that the seeds, whatever be their size, be distributed evenly in the furrow in a substantially predetermined amount for each linear yard thereof and without any bruising or crushing of the seeds as they pass through the drill.

Seed drills of the character to which my invention particularly relates are ordinarily provided with a seed holding hopper in which is disposed an agitator wheel adapted to rotate on a fixed axis and in a fixed position adjacent a delivery port in the bottom of the hopper through which the seeds can flow to the subjacent delivery spout by which they are directed into the furrow which is opened by a plow or other like contrivance with which the drill is provided. For controlling the rate at which the seeds pass into the spout from the hopper, the drill is frequently provided with some form of means such as an adjustable perforated slide or the like interposed between the port in the hopper and the delivery spout which may be moved so as to vary the size of the opening through which the seed must flow in its passage to the spout and my invention particularly relates to the means employed for this purpose.

I have found that when the mechanism for controlling the flow of the seed is so arranged that adjustment thereof merely accomplishes a variation in the size of the opening through which the seed passes it is impossible to secure satisfactory results because the particles of seed are frequently bruised or crushed between the agitator wheel and the edge of the said opening but that, on the other hand when the relative position of the opening with respect to the agitator wheel is varied in correspondence with the particular size of the opening, this bruising or jamming of the seeds is entirely avoided and a free and constant flow of uninjured and perfect seed assured.

A principal object of my invention, therefore, is to provide in a seed drill, novel means by which variations in the relative position of the seed feed opening with respect to the agitator wheel may be effected simultaneously and in correspondence with the adjustment of the drill for sowing various kinds and sizes of seed, the invention further comprehending the provision of means of such character that when any desired one of the plurality of different sized seed openings with which said means are provided is brought into registry with the delivery port in the seed hopper and thus in proximity to the agitator wheel, the opening will be automatically positioned with respect to the latter in such manner that any bruising or jamming of the seeds between the wheel and the edge of the opening in the subsequent operation of the drill will be avoided.

My invention further contemplates the general improvement and simplification of seed drills of the character of those to which my invention is particularly applicable and further includes other objects and novel features of design and construction hereinafter more definitely specified or which will be apparent from the following description of certain forms of seed drills incorporating the principles of my invention.

As the said invention is readily applicable to various forms of drills I have illustrated several of the latter in the said drawing to enable those skilled in the art to readily comprehend and practise the invention but in each instance have shown only so much of the drill itself as is necessary for that purpose. Moreover, as the invention particularly lends itself to utilization in drills embodying a rotatable feed control disk provided with a plurality of holes of different sizes which may be selectively brought into registry with the delivery port in the bottom of the hopper in accordance with the particular size of seed which it is desired to sow, said disks being desirably interchangeable so as to afford a wide range of different sized seed openings, I will first refer to certain forms of drills of this general character and embodying the principles of my invention.

In the said drawings, Fig. 1 is a fragmentary bottom plan view of the hopper and adjacent parts of one of the said drills; Fig. 2 is an enlarged fragmentary view in central vertical longitudinal section of the lower part of the hopper thereof with one of the feeding disks in position and designed to illustrate the relation of the agitator wheel and feed openings of different sizes, and Figs. 3 and 4 are respectively face views of two of the interchangeable feeding disks having different sized feed openings and removed from the drill; Fig. 5 is a fragmentary rear elevation, partially in section, of a different type of drill embodying feed control means in accordance with the principles of my invention; Fig. 6 is a face view of a feed control disk suitable for use with this type of drill and Fig. 7 is a bottom plan view of the hopper and adjacent parts of the drill generally corresponding to Fig. 1; Fig. 8 is a view generally similar to Fig. 7 but illustrating another type of drill also embodying feed control means constructed in accordance with the principles of my invention, said means being slidable instead of rotatable as in the forms of the invention shown in the preceding figures, and Fig. 9 is a face view of the feed control slide shown in Fig. 8 but removed from operative position. Like symbols are used to designate corresponding parts in the several figures.

Referring now more particularly to that form of the invention shown in Figs. 1 to 4 inclusive, it will be understood that the drill is provided with a seed containing hopper 1 which may be either removably or fixedly mounted on the frame of the drill (not shown) in any convenient way. The walls of the hopper are sloped inwardly toward its bottom so as to concentrate the seed at that point and within the hopper is disposed an agitator wheel 2 secured to a shaft 3 extending through the walls of the hopper and driven in any suitable way so as to rotate the agitator wheel under operative conditions in the direction indicated by the arrow. To prevent the seed from being crushed between the periphery of the wheel and the wall of the hopper, it is desirable that the latter be arranged very closely adjacent that portion of the periphery of the wheel which lies substantially between its horizontal diameter and the front edge of the seed port hereinafter mentioned as it is in this region there is the greatest likelihood of the seeds being drawn in and crushed between the wheel and the hopper wall; thus, that part of the wall designated as 4 and lying adjacent the wheel in the region referred to is desirably curved on its inner face to correspond with the curvature of the rim of the wheel and arranged to lie very closely adjacent the latter.

The agitator wheel may be of any suitable form although I prefer to utilize a wheel such as is shown in the drawings and which is bent in opposite directions from its central plane so that its periphery when viewed edgeways has somewhat the appearance of a sinuous line which crosses and recrosses the said central plane, this form of wheel being very effective in stirring up and agitating the seed.

The delivery port 5 through which the seeds pass from the hopper is disposed in the bottom of the latter somewhat behind a vertical plane passing through the axis of the shaft 3 considering the wheel in respect to its direction of operative rotation, and beneath this port and in alignment therewith is disposed a delivery spout 6 through which the seed is conducted to the furrow which is opened by a plow or other suitable device (not shown) carried by the drill, it being understood that the area of the delivery port in the hopper is sufficient to permit the passage of the largest seed which the machine is intended to sow. The delivery spout and the hopper may be supported in any suitable way; for example and as shown through the medium of complementary webs 7 and 8 with which the spout and the hopper are respectively provided and which are drilled for the passage of connecting bolts 9. Between these webs may be interposed a plate 10 which extends outwardly from the webs in one direction for suitable attachment to the frame of the drill and in the other direction extends rearwardly beneath the hopper for a purpose hereinafter described, the plate being provided with an aperture registering with the delivery port so that it presents no obstacle to the passage of the seed to the spout.

Means for controlling the flow of the seed from the delivery port to the spout are provided and comprise, in the form of the invention to which reference is now being made, a plurality of interchangeable disks D each provided with a plurality of seed openings desirably of graduated sizes, that is, all the seed openings in one disk may be of relatively large size as shown in Fig. 1 and all of the openings in another disk of relatively smaller size as shown in Fig. 3 and all of the openings in still another disk of still smaller size as shown in Fig. 4; any desired number of disks may be provided although three will ordinarily be found sufficient to give an adequate number of graduated seed openings to cover the range of seed generally utilized in drills of this character.

Under operative conditions one of these disks is disposed beneath the hopper in such a position that a portion of it is interposed between the under face of the hopper and the upper end of the delivery spout and the disk is rotatably supported on a suitable pivot as, for example, a removable stud 15 extended through a hole at the axis of the disk and through the rearwardly projecting portion of the plate 10, the stud being held in operative position by a cotter pin 16 or in any other convenient way. Thus, by removing the cotter pin the disks can be readily interchanged when desired.

Each of the feed control disks comprises a circular plate 20 of sheet metal of such thickness as to prevent the disk from being readily bent out of shape and is provided with a central pivot hole 21 for the passage of the pivot stud, an annularly spaced series of locking holes 22 surrounding and radially spaced from the pivot holes and an annularly spaced series of seed feed openings 23 adjacent the rim of the disk and arranged as hereinafter more particularly described.

To accommodate the disk when assembled with the hopper the inclined bottom or under face of the latter is disposed in two parallel planes one above the other and separated by a distance substantially equal to the thickness of the disk. Thus the portion 24 of said face which lies behind and adjacent the sides of the delivery port 5 is upwardly offset from the portion 24' which lies in front of the port and generally beneath the agitator wheel so that a shoulder 25 is provided which coincides with and forms in fact the front edge of the port. Thus, when the disk is in operative position a part of that portion of the disk which lies in front of the pivot 15 is disposed in the recess formed by the upward offsetting of the face 24 and the subjacent web or plate 10, the arrangement being such that the series of seed holes 23 in the disk are aligned with the delivery port in the hopper, the port of course being of greater size than the largest hole in any of the disks so as not to obstruct the same when registered therewith.

Any suitable means such as a bolt 30 co-operative with any of the series of locking holes 22 in the disk and with a hole in the web or plate 10 may be utilized for holding the disk in any desired position of rotative adjustment so as to maintain any one of the feed openings in registry with the delivery port, the relative position of the various locking holes and feed openings in each disk being of course so calculated that for each opening there is a corresponding locking hole for the reception of the bolt or other locking means so disposed that when the locking means is positioned therein the corresponding feed opening will be in proper registry with the port. Thus, by removing the locking means the disk may be rotated about the pivot 15 so as to bring any desired feed opening into registry with the delivery port and then locked in position through the medium of the locking means.

Any suitable means are preferably provided for positively cutting off the flow of seed from the hopper to the delivery spout irrespective of the adjusted position of the feed control disk, as, for example, a cut-off plate 32 pivoted near its center on the pivot stud 15 for oscillation at one end in a slot or recess formed in the web 7 of the delivery spout from a position in which it is out of alignment with the delivery port, as shown in Fig. 1, to a position in which it is aligned therewith so as to effectually close it against the flow of seed, the movement of the cut-off plate being effected in any convenient way as, for example, by a rod for the like (not shown) extending from its opposite end to any point where it may be conveniently operated manually by the operator of the drill.

As each disk when operatively adjusted occupies a predetermined position with respect to the other parts of the seed drill, the relation between the operative seed feed opening in the disk and the agitator wheel is necessarily determined by the distance between the axis of the disk and the center of the feed opening, and I have found that when large seeds are being sown it is desirable, in order to avoid bruising or crushing of the seeds between the agitator wheel and the edges of the seed opening as they pass therethrough, that said openings be disposed at a greater distance from the axis of rotation of the wheel than when seeds of a smaller character are being sown and vice versa. To accomplish this result in accordance with the present invention, I progressively increase the distance between the centers of the seed openings and the centers of the disk in which they are formed as the openings become progressively smaller so that the center of the largest feed opening in each disk is most nearly adjacent the center of the disk and that of the smallest opening most remote therefrom, this progressive increase in the distances being desirably maintained throughout the entire series of disks intended for use with the drill. However, as the decrease in the size of the openings in any one disk is usually quite gradual, it is in practice unnecessary and, in fact, quite difficult to correspondingly increase the distance between the centers of an adjacent group of feed openings, particularly as to preserve the theoretically proper relation of each opening with the agitator wheel the center of the opening should be moved outwardly from the center of the disk for a distance equal to but one-half of the difference in diameter between such opening and the next larger opening. Therefore I have found that satisfactory results can be obtained in practice where the difference in the size of adjacent openings is small, by arranging the openings in adjacent groups or series and disposing the centers of each group on an arc of a predetermined radius struck from the center of the disk. Thus, as shown in Fig. 3, the feed openings 23 in that disk comprising a group of seven openings decreasing very gradually in diameter in a clockwise direction have their centers all located on an arc of 1-13/64" radius; the next group of four openings 23ª of gradually decreasing diameter have their centers on an arc 2-1/16" radius while the last group of two openings 23$^b$ have their centers disposed on an arc of 2-5/64" radius. In like manner the smaller openings in the disk illustrated in Fig. 4 are arranged in groups designated as 23$^c$, 23$^d$, 23$^e$, 23$^f$, 23$^g$ and have their centers respectively disposed on arcs of increasing radii. Thus, while under such conditions the relation between the agitator wheel and the centers of all of the openings in each group in a given disk is the same, a slightly different relation exists between it and all of the openings in the next adjacent group and so on with the result that while this variation is ordinarily quite small as between two openings of fairly similar diameter disposed in adjacent groups, there is a very material difference in the relation when considered with respect to the largest opening and the smallest opening in a given disk and, to an even greater extent, in the whole series of disks. This will be clearly brought out by reference to Fig. 2 showing a disk in operative relation with the hopper. In this figure the diameter of the largest feed opening in the disk is indicated as X and that of the smallest opening as Y and it will be noted that the latter would occupy a position much closer to the agitator wheel than does the former.

It will thus be apparent that because of the novel arrangement of the feed openings in the feed control disk, said openings are progressively and automatically moved in toward the agitator wheel as the disk is rotated to progressively register openings of decreasing size with the delivery port 5, which would not be the case if the centers of all of the feed openings, irrespective of their size, were equidistant from the centers of the disk; in consequence, the relation between any given opening and the rim of the agitator wheel is such as to enable the seed for which said opening is intended to pass through it while the wheel is rotating without being crushed or bruised against the edges of or jamming in or clogging the opening so that an even and constant flow of perfect seeds is insured.

In Figs. 5, 6 and 7 I have shown a somewhat modified form of the invention as embodied in a seed drill adapted to simultaneously sow two rows of seed. To this end the drill, instead of being provided with a single delivery spout as in the form of the invention shown in Fig. 1, is provided with a spout having two laterally divergent branches 6' and 6" which merge together adjacent the hopper so that the passages within the respective branches are at this point separated merely by a thin vertically extending wall or partition 33, the edge of which terminates substantially in the plane of the upper end of the spout and is desirably disposed substantially coincident with the median line of the delivery port in the superjacent hopper. Under these circumstances in order to attain the advantages of my invention and in accordance therewith I provide interchangeable seed feed disks 20' in which the seed feed openings are grouped in pairs respectively annularly spaced about the periphery of the disk, the holes in each pair being of the same size and annularly separated for a distance substantially corresponding to the thickness of the upper end of the partition 33 and the centers of each pair of holes being spaced from the center of the disk in conformity with their diameter. In Fig. 6 I have shown removed from the drill a disk in which the holes are arranged in the manner just described and, similarly to the arrangement adopted in the disks shown in Figs. 3 and 4, the respective pairs of holes are arranged in groups in each of which the centers of all of the holes are disposed the same distance from the center of the disk. Thus, the largest holes 23$^h$ are arranged in one group with their centers disposed at a given distance from the center of the disk, each pair of holes in this group considered in a counterclockwise direction being of slightly smaller diameter than the preceding pair. The next group comprising three pairs of holes 23$^i$ of gradually decreasing diameter are disposed with their centers somewhat farther from the center of the disk than the holes comprising the first group, while the three pairs of holes 23$^j$ in the third group, which are also of respectively decreasing diameter, have their centers located still further from the axis of the disk in consequence of which when any pair of holes is brought to operative alignment or registry with the delivery port in the superjacent hopper they will occupy a proper relation with respect to the agitator wheel to insure satisfactory passage of seed to the delivery spout since the centers of the smaller holes will be disposed more closely adjacent the agitator wheel than the centers of the larger ones, just as in the case of the form of the invention hitherto described. It will be further apparent that by reason of the grouping of the holes in pairs a seed opening will be provided for each branch of the subjacent delivery spout through which the seed can pass thereto, thus insuring an even and constant feed to each branch of the spout.

In Figs. 8 and 9 I have shown still another form of the invention in which instead of the seed openings being disposed in a rotating plate and thus capable of being brought into registry with the delivery port in the hopper by rotation of the disk about a fixed axis, the seed openings are located in a plate or slide 35 which is longitudinally movable relatively to the hopper in a direction parallel to the axis of rotation of the agitator wheel. This slide may consist of a strip of metal of suitable width and thickness and is arranged to be slidable through a slot formed beneath the delivery port in the bottom of the hopper either in the latter or in the top of the delivery spout. As shown the slide is provided with four feed openings 23$^w$, 23$^x$, 23$^y$, 23$^z$, though any desired number may be used, consisting of circular holes arranged in pairs transversely of the slide and so located with respect to the center line thereof that their centers will progressively approach the same as the holes decrease in size. Thus, when the plate is so moved as to bring the hole 23$^w$ into registry with the delivery port 5 as in Fig. 8, the hole will be disposed with its center at a greater distance from the agitator wheel than will be the smaller hole 23$^x$ when brought to operative position. Similarly, either of the holes 23$^y$ and 23$^z$ may be utilized by simply removing the plate from its normal position in the hopper and turning it end for end so as to bring these holes into transverse alignment with the delivery port, after which either of the said holes may be registered therewith by a suitable longitudinal movement of the slide. Owing to the fact that these last mentioned holes are also located progressively nearer to the center line of the plate as their diameters increase, the smaller of the said holes will lie more closely adjacent the axis of rotation of the agitator wheel when in operative position than will the larger.

It will thus be apparent that in accordance with the principles of my invention, in each of the different forms of drills to which I have referred, the arrangement of the feed holes is such that when they are selectively brought to operative position the larger holes will be so disposed that their centers are farther from the agitator wheel than the smaller holes or, in other words, that as the feed holes progressively increase in size they are disposed with their centers correspondingly farther from a vertical plane through the axis of rotation of the agitator wheel, thus enabling the particular size of seed for which the hole is adapted to pass through the hole while the agitator wheel is rotating without being forced against the rim of the hole by the wheel and thereby crushed or bruised and without any jamming within the hole itself. It will be further apparent that the principles of my invention are readily adaptable to various types and styles of seeders other than those to which I have referred and irrespective of the particular or specific details of constructon thereof and also that, as above explained, the feed holes may be arranged singly in spaced relation with each other or arranged in pairs to thereby effect simultaneous distribution of seeds to a pair of delivery spouts instead of to a single spout.

Having thus described my invention, I claim and desire to protect by Letters Patent of the United States:

1. The combination with a seed drill comprising a hopper adapted to hold the seeds to be sown and having a feed port in its bottom, a delivery spout below the port and an agitator wheel rotatable within the hopper adjacent the port, of means for controlling the passage of the seed from the hopper to the spout comprising an element movable with respect to the hopper and provided with a plurality of holes of graduated sizes adapted to be selectively brought into registry with the port by movement of the element, said holes being so located in the element that when registered with the port the centers thereof will be disposed at increasingly greater distances from said wheel as the holes increase in size.

2. The combination with a seed drill comprising a hopper adapted to hold the seed to be sown and having a delivery port in its bottom, a delivery spout below the port and an agitator wheel mounted to rotate on a fixed axis within the hopper, of means for controlling the passage of the seed from the hopper to the spout comprising a movable element extending beneath said port and provided with a plurality of holes of different diameter adapted to be selectively brought into registry with said port by movement of said element, said holes being so located in the element that when registered with the port the center of the largest hole will be disposed at a greater distance from the axis of rotation of the wheel than the center of a hole of materially smaller diameter than the largest hole.

3. In combination with a seed drill comprising a hopper adapted to hold the seed to be sown and having a delivery port in its bottom, a delivery spout below the port and an agitator wheel mounted to rotate on a fixed axis in the hopper, of means for controlling the passage of the seed from the hopper to the spout through said port comprising a member movable with respect to the hopper and the port and having a plurality of holes of graduated sizes disposed therein adapted to be selectively brought into registry with said port by movement of said member, the holes being so disposed in the member that as holes of progressively smaller size are consecutively brought into registry with said port their centers will be respectively disposed at decreasing distances from the axis of rotation of said wheel.

4. A seed drill comprising a hopper adapted to hold the seed to be sown and having a seed port in its bottom, a delivery spout below the port, and means for controlling the passage of the seed from the hopper to the spout comprising a rotatable disk provided with a plurality of annularly spaced seed openings of different sizes disposed with their centers at increasingly greater distances from the center of the disk as the openings decrease in size.

5. A seed drill comprising a hopper adapted to hold the seed to be sown and having a seed port in its bottom, a delivery spout below the port, and means for controlling the passage of the seed from the hopper to the spout comprising a rotatable disk and a pivot for the disk, said disk being provided with a plurality of annularly spaced openings of decreasing diameter adapted to be selectively aligned with said delivery port by rotation of the disk and so disposed in the disk that the centers of the openings lie at increasingly greater distances from the center of the disk as the openings decrease in size.

6. As an article of manufacture, a feed control disk for a seed drill comprising a circular metallic disk having a plurality of circular annularly spaced seed feed openings of gradually decreasing size adjacent its periphery, the centers of the openings being progressively disposed at increasing distances from the center of the disk as the openings decrease in size.

7. As an article of manufacture, a feed control disk for a seed drill comprising a circular disk of metal having a pivot hole at its center, a series of annularly spaced locking holes symmetrically surrounding said pivot hole, and a plurality of circular annularly spaced seed feed openings adjacent its periphery, said feed openings being graduated in size and the centers thereof being progressively spaced from the center of the disk as the openings decrease in size.

In witness whereof, I have hereunto set my hand this 25th day of April, 1928.

CHARLES J. ALLEN.